Jan. 27, 1931.                H. W. SANFORD ET AL            1,790,326
                                    MINE CAR
                       Filed Oct. 18, 1927      7 Sheets-Sheet 1

Inventors
William O. McKamey
Hugh W. Sanford
By Cyrus Keller
                Attorney

Jan. 27, 1931.  H. W. SANFORD ET AL  1,790,326
MINE CAR
Filed Oct. 18, 1927   7 Sheets-Sheet 4

Jan. 27, 1931. H. W. SANFORD ET AL 1,790,326
MINE CAR
Filed Oct. 18, 1927 7 Sheets-Sheet 5

Jan. 27, 1931. H. W. SANFORD ET AL 1,790,326
MINE CAR
Filed Oct. 18, 1927    7 Sheets-Sheet 7

Patented Jan. 27, 1931

1,790,326

UNITED STATES PATENT OFFICE

HUGH W. SANFORD AND WILLIAM O. McKAMEY, OF KNOXVILLE, TENNESSEE

MINE CAR

Application filed October 18, 1927. Serial No. 227,012.

Our invention relates particularly to mine cars and other cars of any type wherein the frame of the car has side sills and end sills connecting the side sills.

For a car of this type, reference is made to Letters Patent of the United States, No. 1,486,547, granted to Hugh W. Sanford, March 11, 1924.

The object of this invention is to so modify the structure of that patent as to embody a link coupling in a desirable form, provision being made for space between the bumper faces in which one of the coupling links may hang in upright position when the bumpers meet. The improvement also comprises yielding means on one of the end structures for holding one of the coupling links.

In the accompanying drawings,

Figs. 14, 15, 16, 17 and 18 illustrate other forms of the structure illustrated by the preceding figures. In Figs. 14, 16 and 18, the section is taken close to the bumper members.

Referring to the drawings, A, A are side sills. In the form shown by the drawings, these sills are of channel-shape each having an upper flange, A1, and a lower flange, A2, both flanges being directed outward.

Figure 4:
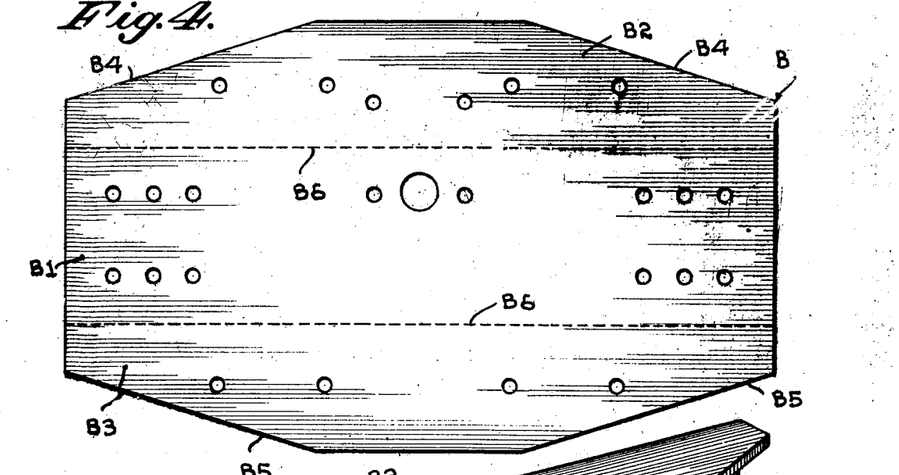
Fig. 4 is a plan showing a sheet metal blank from which is made the body of the end sill structure for the forward end of the car.
Figure 5:
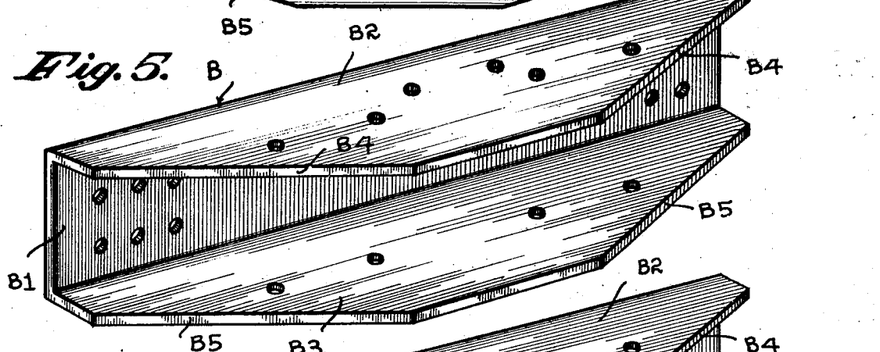
Fig. 5 is a perspective of said end sill structure detached from other parts.
Figure 5A:
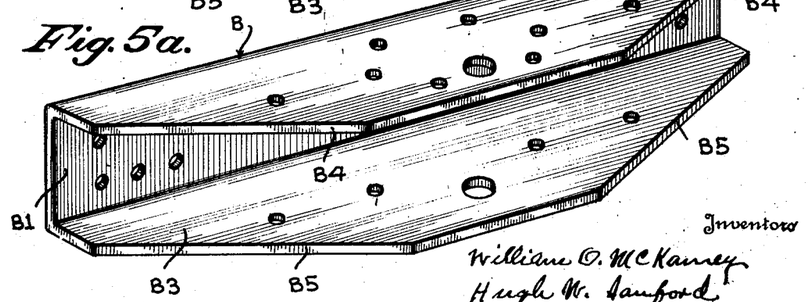
Fig. 5a is a perspective showing the body of the end sill structure for the rear end of the car—the structure shown at the left in Figs. 1 and 2.
Figure 6:
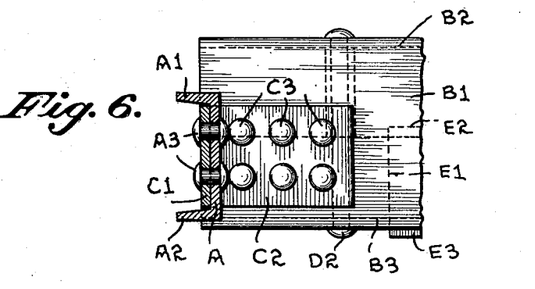
Fig. 6 is an upright section on the line, 6—6, of Fig. 1, looking in the direction of the arrow.

B is the steel plate member of the end sill structures. This has the upright web, B1, and an upper horizontal flange, B2, and a lower horizontal flange, B3. The corners of the flange, B2, are cut to make slanting edges, B4, and the corners of the lower flange, B3, are similarly cut to make slanting edges, B5, (Fig. 5). This member, B, is formed by folding the blank of Fig. 4 along the dotted lines, B6. The blank of Fig. 4 is cut from a plate of rolled steel of desired thickness. This member is also provided with holes, as shown by the drawings.

With this member, B, are combined other members to form the complete end sill structure in a general way as described in said Patent, No. 1,486,547, but with material differences, as will appear further on herein.

In the form shown in the drawings, the plate member, B, is long enough to partially over-lap the adjacent ends of the side sills, A. Said plate member and the side sills are joined to each other by means of corner angle members, C, which are unitary castings such as are described in said Patent, No. 1,486,547. One arm or blade, C1, of each angle member rests against the outer flat face of the upright web of the adjacent side sill, A, and is secured to said web by rivets, A3, extending through said arms and said web. The drawings show six such rivets. The other arm or blade, C2, of each angle member lies against the adjacent part of the back face of the upright web, B1, of the plate member, B. Rivets, C3, extend through said arm and said web to join said parts to each other. In the drawings, six such rivets are shown.

Figure 1:
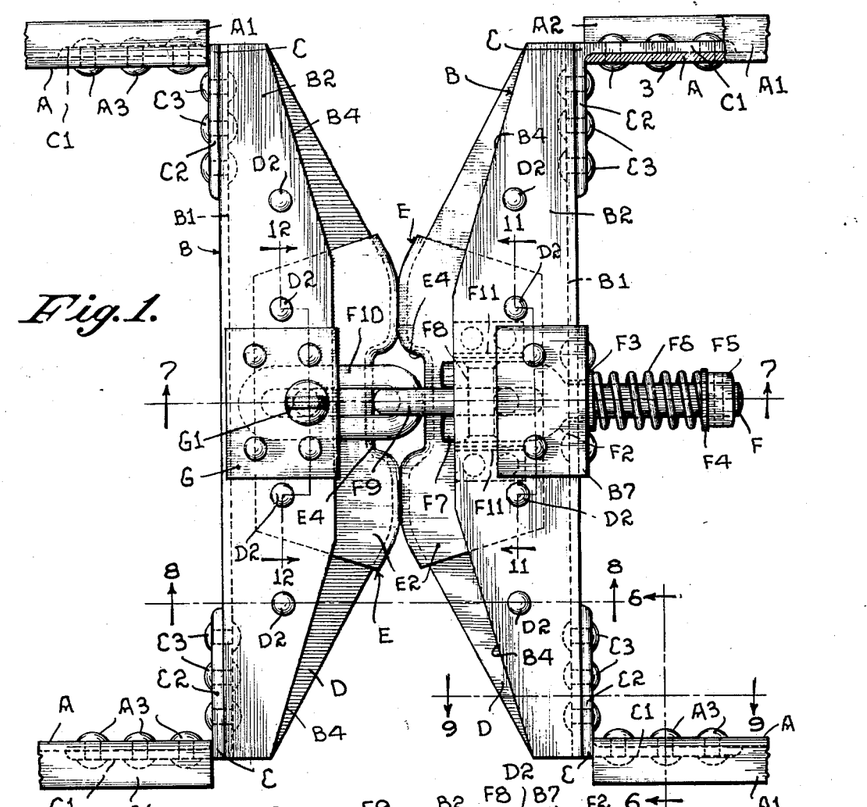
Fig. 1 is a plan of a structure embodying our improvement.
Figure 7:
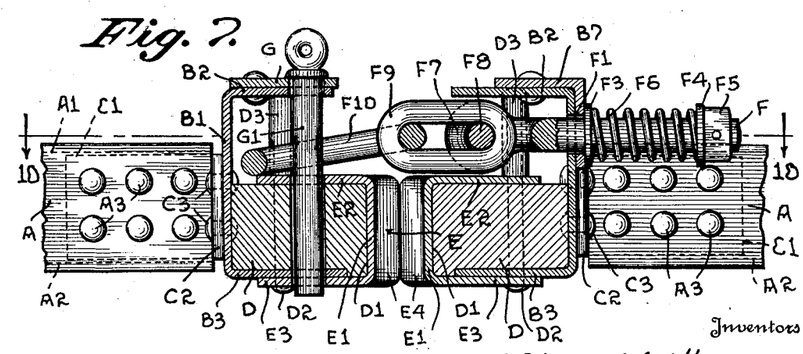
Fig. 7 is an upright section on the line, 7—7, of Fig. 1, looking in the direction of the arrow, the left hand end sill structure being higher than is shown in Fig. 2.

The end sill structure in the right hand part of Fig. 1 and in the right hand part of Fig. 7 is for one end of the car while the other end sill structure shown by those two figures is for the other end of the car. The first of these end sill structures is arbitrarily designated as being for the front of the car or as being the front end sill structure, while the other of said sill structures is termed the rear end sill structure. There are minor mechanical differences between these structures, both in the plate members, B, and in the parts associated with those members. In the front structure, the plate member is the same as in said Patent, No. 1,486,547, excepting that provision is made for a sliding bearing for the coupling stem. In the rear end structure, the web, B1, is lower than in the front end structure, and the upper flange, B2, is narrower.

Referring now only to the front end structure, an inner or second member, D, of strong wood, preferably oak, is placed on the lower flange, B3, and against the upright web, B1, of the plate member, B. The upper and the lower and the inner faces of this wood member, D, are straight; while the outer face of the wood member conforms approximately to the outer edges of the flanges, B2 and B3, of the plate member, B, excepting that from the outer ends toward the middle, the member, D, is gradually extended outward away from the edges of said flanges, until near the middle of the member, D, where, at D1, its upright face is indented nearly to the adjacent faces of the flanges, B2 and B3, the width of indentation being a little more than the width of one of the coupling links. This wood member constitutes a filling or cushion member. It rests on the lower flange, B3, of the plate member. Its height is less than the height of the upright web, B1, of the plate member, B. Thus space is left between the member, D, and the upper flange, B2, of the plate member.

A metal bumper member, E, is placed on the member, D, at the middle of the latter. The member, E, is curved and channel-form, having an upright web, E1, and an upper flange, E2, and a lower flange, E3. The upright web has an indentation, E4, conforming to the indentation, D1, in the cushion member, D. Thus all of the web, E1, bears against the outer face of the cushion member, D. A part of the flange, E3, underlaps the flange, B3.

Four bolts, D2, are shown extending through the upper flanges, B2, and the cushion member, D, and the lower flange, B3. Between the upper flange, B2, and the cushion member, a spacing sleeve, D3, surrounds each bolt to maintain the distance between said upper flange and the cushion member.

Midway between the ends of the plate member, B, a reinforcing angle member, B7, is placed upon or against the outer face of the web, B1, and the upper flange, B2. The web, B1, and the adjacent arm or wing of the angle member, B7, are apertured midway between the ends of the member, B, to form a bearing, F1, for the coupling stem, F. On said stem, at the inner face of the web, B1, is a fork, F2, presenting a shoulder which limits the movement of said stem toward the opposite end of the car. At the other side of said bearing is a washer, F3, resting against the angle member, B7. At the end of said stem is a nut, F4, against which rests a washer, F5. Between the washers, F3 and F5, an expanding coiled spring, F6, surrounds the stem. The fork, F, on the stem, F, has eyes, F7, on a horizontal axis. A pintle, F8, extends through said eyes and the coupling link, F9. On the link, F9, is a second or outer coupling link, F10. The thickness of the eyes, F7, and the height of the link, F9, nearly fill the space between the flanges, B2 and E2. The link, F9, projects horizontally beyond the adjacent wall of the bumper member, E (at the indentation E4) far enough to allow the link, F10, to hang in the upright position in said indentation when said link is not in position in the companion end structure.

To prevent the coupling stem, F, from turning in the bearing, F1, a stop member, F11, is seated on the upper flange, E2, of the bumper member, E, at each side of the eyes, F7. Each stop member is angle-form and has one flange resting on and riveted to said upper flange, E2, while the other flange of the stop member extends upward near the adjacent face of the adjacent eye of the coupling stem.

Figure 2:
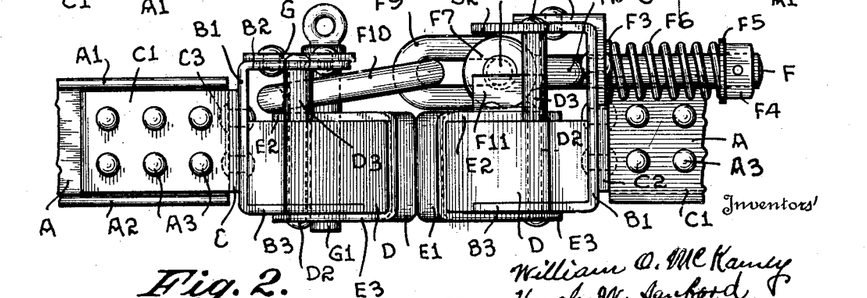
Fig. 2 is an elevation looking at the structure of Fig. 1 toward the upper end of the sheet.
Figure 3:
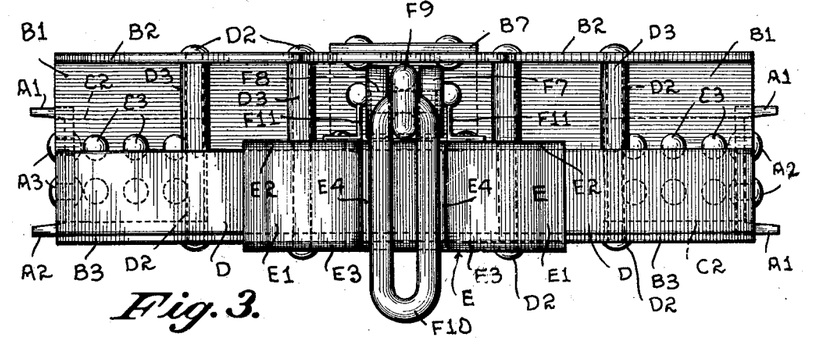
Fig. 3 is an elevation looking at the right hand end structure of Figs. 1 and 2 from the left, the outer link hanging downward.
Figure 8:
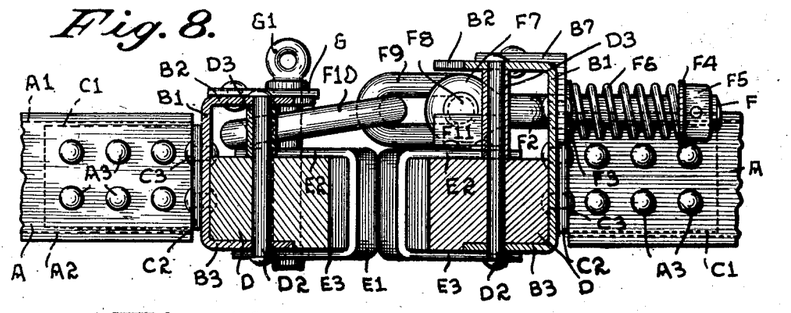
Fig. 8 is an upright section on the line, 8—8, of Fig. 1, looking in the direction of the arrow.
Figure 9:
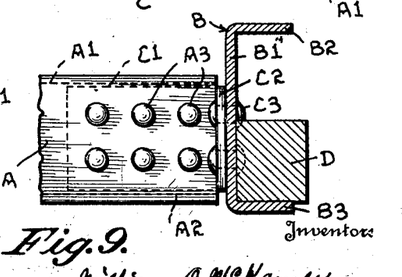
Fig. 9 is an upright section on the line, 9—9, of Fig. 1, looking in the direction of the arrow.
Figure 10:
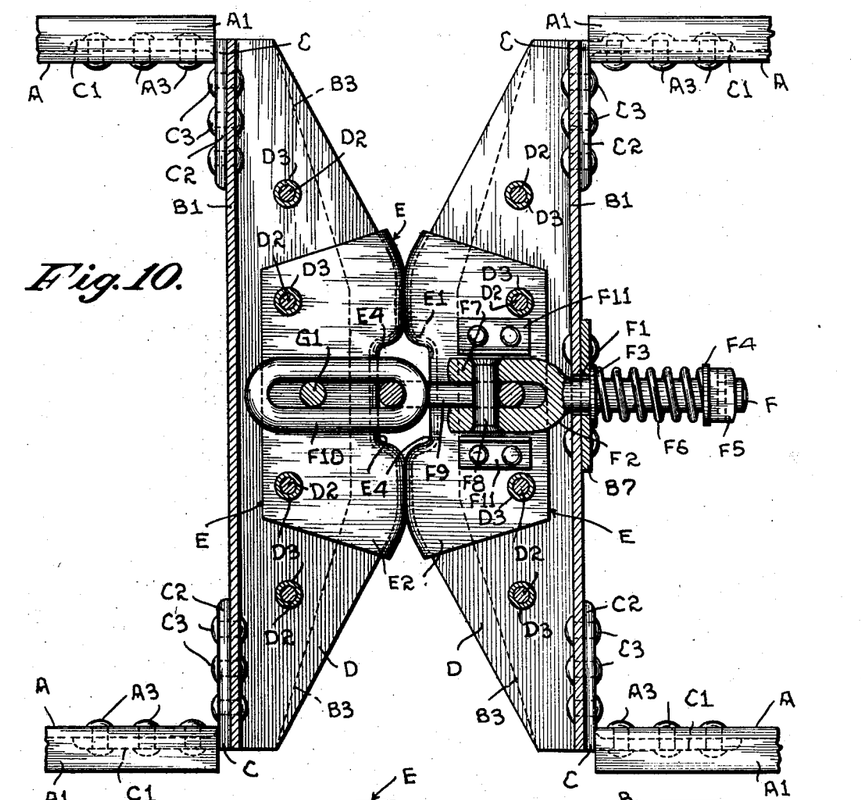
Fig. 10 is a horizontal section on the line, 10—10, of Fig. 7.
Figure 11:
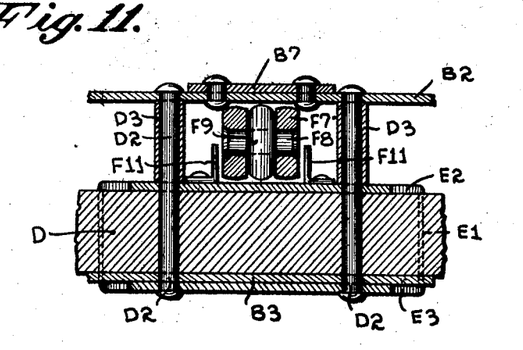
Fig. 11 is an upright section on the line, 11—11, of Fig. 1, looking in the direction of the arrow.
Figure 12:
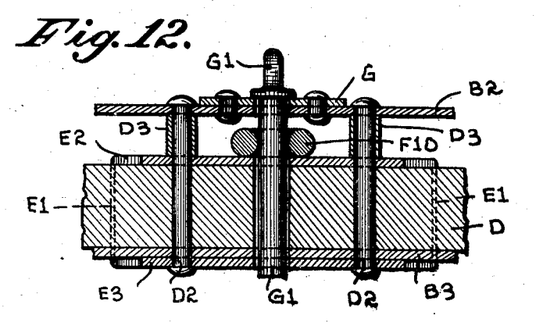
Fig. 12 is an upright section on the line, 12—12, of Fig. 1, looking in the direction of the arrow.
Figure 13:
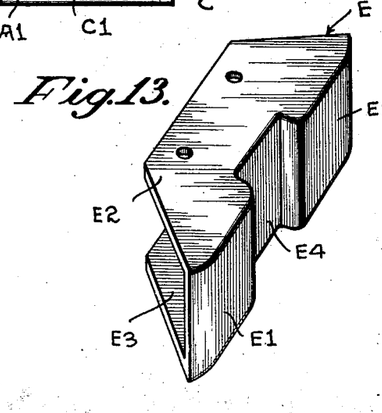
Fig. 13 is a perspective of the metal bumper member of the forward end structure of the car.

Turning now to the companion end structure (the structure for the rear end of the car), the reinforcing angle member, B7, is omitted, and a reinforcing plate, G, is placed on and riveted to the middle of the upper flange, B2. A coupling pin, G1, extends loosely through the plate, G, and the upper flange, B2, and the upper flange, E2, and the cushion member, D, and the lower members, B3 and E3. When the bumper members, E, are against each other and the second link, F10, is in position between the flanges, B2 and E2, the coupling pin also extends through the link, F10. Thus the coupling is made complete. But whenever the two bumper members meet and the link, F10, has not been placed so as to cause it to enter the companion end structure, said link will hang in the upright position in the indentation of the adjacent end structure. Thus said link is not jammed by the meeting of these end structures. In Fig. 7, the upright web, B1, in the left hand or rear end sill structure extends higher than in Figs. 2 and 8. That permits the left hand end of the link, F10, to rise as high as the right hand end of said link during such times as said link is in pulling engagement with the coupling pin, G1.

When the rear end of our car having these two end structures is to be coupled to another car provided for ordinary link coupling, a link may be put into the rear end of our car in the position of the link, F10, of the drawings and made to support another link which can hang in the indentation, D1, of that end structure.

The manner of joining the link, F9, and the coupling stem, F, requires considerable space between the flanges, B2 and E2. This brings the adjacent end of the second link, F10, nearly as high as the upper flange, B2, of the companion end structure. Thus the link, F10, is ordinarily inclined. As above indicated, a part of the outer edge of the adjacent upper flange, B2, of the rear end structure is cut away to clear the link, F10.

When pulling strain is exerted on the coupling, that strain is transmitted through the stem, F, and the nut, F4, and by the latter through the washer, F2, to the coiled spring, F6.

It will be observed that the forward end structure is adapted to couple with a car having any form of coupling structure adapted to receive the second or outer link, F10, and engage said link with a pin or similar device.

The outer end of the link, F10, is free to move up and down, and the link, F9, is allowed some upward turning. This allows for up and down movement of the meeting end structures independently of each other.

When two coupled cars pass a curve in the track, the meeting faces of the bumper members at the outer side of the curve will separate, the corresponding parts of said faces at the opposite side of the indentations bearing upon each other. When that occurs, there is a strain on the stem, F, and a tendency to compress the spring, F6. But the length of the outer link, F10, should be made sufficient, as shown, to allow some slack at the coupling, whereby some such separation may occur without compressing the spring, F6.

Figure 14:
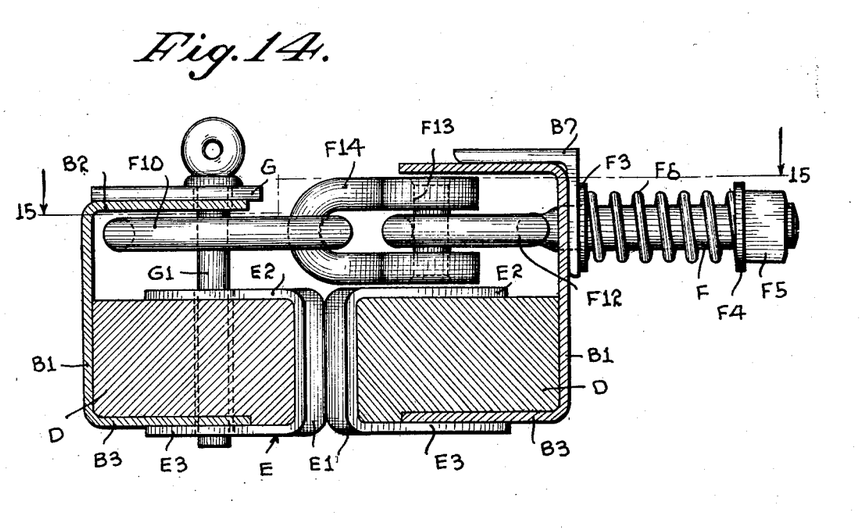
Figure 15:
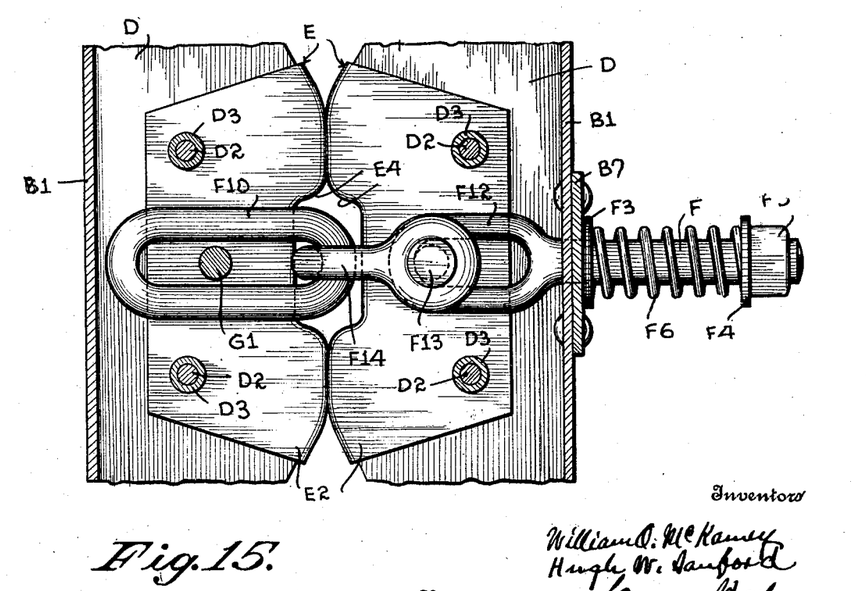
Figure 16:
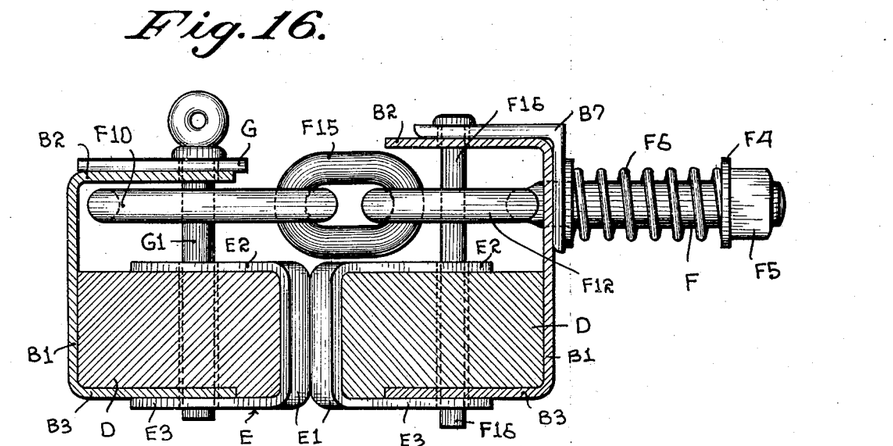
Figure 17:
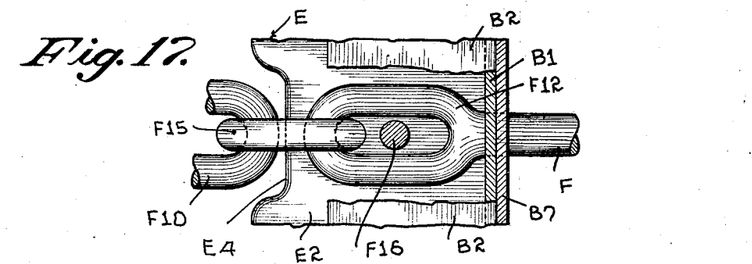

In Figs. 14 and 15, the structure is the same as in the preceding figures, excepting that the fork, F2, is changed to a horizontal link, F12, rigid on the stem, F, and which receives a pintle, F13, extending through and below the link, F12, and the U-form link, F14, and the link, F2, that link and the U-form link, F14, which extends above and below the link, F12. In Figs. 16 and 17, the structure is the same as in Figs. 14 and 15, excepting that a closed link, F15, extends through the link, F12, and an upright pin, F16, extends through the plate members, B2, B7, the link, F12, and the plate members, E2, B3 and E3, like a coupling pin. The function of this pin, F16, is to retain the link, F12, in case the spring, F6, or the nut, F4, or any part of the stem, F, become deranged or detached. It is to be observed that this pin is so set in the link, F12, as to allow said link to move outward some distance before engaging the pin.

Figure 18:
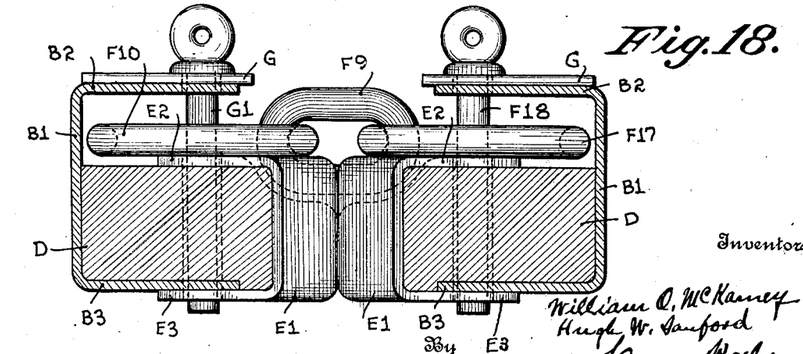

In Fig. 18, the stem, F, and spring, F6, are omitted and a link, F17, like the link, F10, on the other end structure, is given the place of the link, F12, of Figs. 16 and 17, and extends through the link, F9. The steel plate member, the reinforcing plate, G, and the bumper member are of the same construction as in the companion end sill structure, but reversed in direction. A coupling pin, F18, extends through the plate, G, the flange, B2, the link, F17, the flange, E2, the wood member, D, and the flanges, B3 and E3. When either the link, F10 or F17, is free from its end sill structure, that link and the link, F9, may hang in the indentation on the other bumper member.

It will be understood that the bumper member indentations may be varied in size and shape to adapt them to the form and position of the link or links they are to receive.

We claim as our invention:

1. A composite end sill structure for railway cars, said structure comprising a plate metal end member having an upright web and upper and lower horizontal flanges directed away from the car frame, an indented filling member between said flanges, and a metal bumper member extending across the filling member and indented at the indentation of the filling member.

2. A composite end sill structure for railway cars, said structure comprising a plate metal end member having an upright web and upper and lower horizontal flanges directed away from the car frame, an indented filling member between said flanges, and a metal bumper member extending across the filling member and the lower flange of the metal plate member and indented at the indentation of the filling member.

3. A composite end sill structure for railway cars, said structure comprising a plate metal channel member having an upright web and upper and lower horizontal flanges directed away from the car frame, an indented filling member located between and reaching outward beyond said flanges, bolts extending through said flanges and filling member, spacing sleeves on said bolts, and an indented metal bumper member extending across said filling member and indented at the indentation of the filling member.

4. In a railway car end sill structure, the combination of a plate metal end sill member having an upright web and upper and lower horizontal flanges directed away from the car frame, a horizontal coupling stem slidable endwise in the upright web, and means for preventing turning of the stem.

5. In a railway car end sill structure, the combination of a plate metal end sill member having an upright web and upper and lower horizontal flanges directed away from the car frame, a filling member between said flanges, a metal bumper member extending across the filling member, a horizontal coupling stem slidable endwise in the upright web, and means on the bumper member for preventing turning of said stem.

6. In a composite end sill structure for railway cars, the combination of a horizontal transverse metal member supported by the sides of the car frame and bearing a lower horizontal flange directed away from the car frame, a metal bumper member supported by said transverse member and being indented midway between the ends of said transverse metal member, and means for supporting a coupling link above and in line with said indentation whereby said link may occupy said indentation when free from engagement with an adjacent car.

7. In a composite end sill structure for railway cars, the combination of a traction truck frame including side sills and an end sill structure having its ends rigidly connected to the side sills, the end sill structure including a transverse metal member bearing a substantially horizontal lower flange directed away from the frame of the car, and the end sill structure including also a metal bumper indented midway between the ends of said structure, and means for supporting a coupling link above and in line with said indentation whereby said link may occupy said indentation when free from engagement with an adjacent car.

In testimony whereof we have signed our names this 8th day of October, in the year one thousand nine hundred and twenty-seven.

WILLIAM O. McKAMEY.
HUGH W. SANFORD.